United States Patent [19]

Mattson

[11] 4,371,483
[45] Feb. 1, 1983

[54] APPARATUS AND PROCESS FOR VULCANIZING, ADJUSTED FOR VARIABLE LOCATION OF POINT OF LEAST CURE

[75] Inventor: William F. Mattson, Hinckley, Ohio

[73] Assignee: The B. F. Goodrich Company, New York, N.Y.

[21] Appl. No.: 338,830

[22] Filed: Jan. 11, 1982

[51] Int. Cl.³ ............................................. B29H 5/02
[52] U.S. Cl. ................................ 264/40.6; 264/315;
 264/326; 425/29; 425/30; 425/144; 425/157;
 425/260; 425/162
[58] Field of Search ...................... 264/40.6, 315, 326;
 425/29, 30, 144, 157, 160, 162, 149; 73/362 R

[56] References Cited

U.S. PATENT DOCUMENTS

| | | | |
|---|---|---|---|
| 3,102,425 | 9/1963 | Westman et al. | 73/362 R |
| 3,649,729 | 3/1972 | Davis et al. | 264/315 X |
| 3,659,974 | 5/1972 | Neugroschl | 425/29 |
| 3,718,721 | 2/1973 | Gould et al. | 425/29 X |
| 3,819,915 | 6/1974 | Smith | 425/29 X |
| 3,893,792 | 7/1975 | Laczko | 425/149 |
| 4,022,555 | 5/1977 | Smith | 425/30 X |
| 4,044,600 | 8/1977 | Claxton et al. | 425/29 X |
| 4,344,142 | 8/1982 | Diehr et al. | 425/144 X |

*Primary Examiner*—J. Howard Flint, Jr.
*Attorney, Agent, or Firm*—Alfred D. Lobo; Michael J. Colitz, Jr.

[57] ABSTRACT

An apparatus and process are provided for delivering the precise optimum number of cure equivalents to the exact point of least cure for each tire, though the location of the point varies from one tire to another tire of different geometry, and may vary in tires of the same geometry if there is a change in normal operating conditions. A cure is effected with the aid of a small computer means utilizing only two boundary temperature conditions and the ambient temperature, irrespective of where the boundary conditions are sensed. Preferably, the boundary condition temperatures are obtained without invading the body of the tire, from (1) a measurement of the hot water temperature after it leaves the bladder, and (2) either (i) at the interface of the inner surface of the mold and outer surface of the tire, or (ii) at the surface of the mold, which surface is separated from the outer surface of the tire by the thickness of the mold, or (iii) of the steam outside the mold, the temperature of which steam is measured at a point distally located from the mold's surface. A simplified one-dimensional heat transfer equation containing a response factor (M) applied at several points within a phantom path in the body of the tire, generates a time-temperature profile from which the point of least cure can be tracked and located by the small computer. The time-temperature profiles generated at each point by the small computer mimic the profiles generated in a large computer using a three-dimensional finite difference program, because of the M values generated by the large computer and applied in the small one.

21 Claims, 4 Drawing Figures

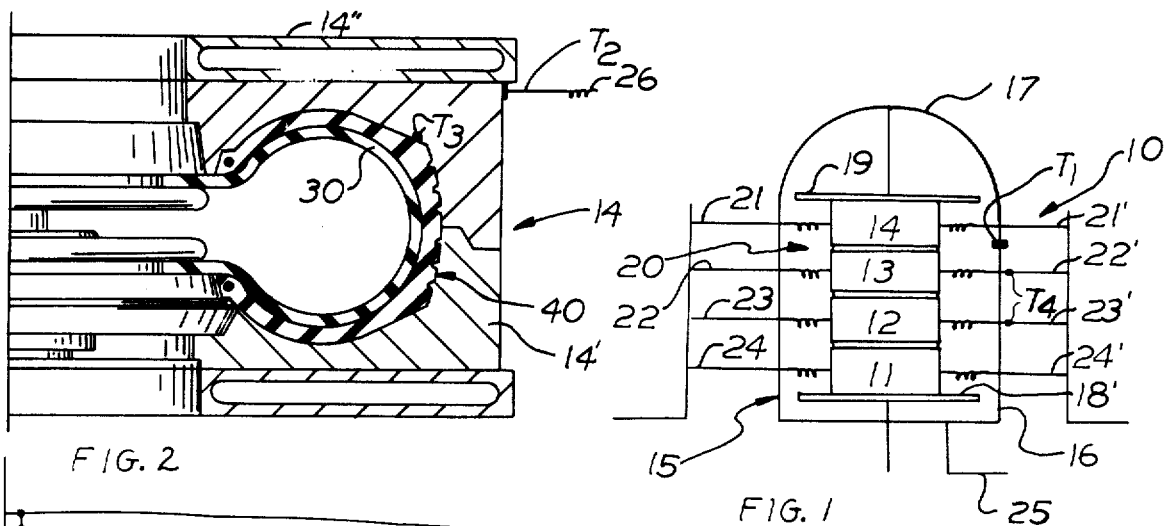
FIG. 2
FIG. 1
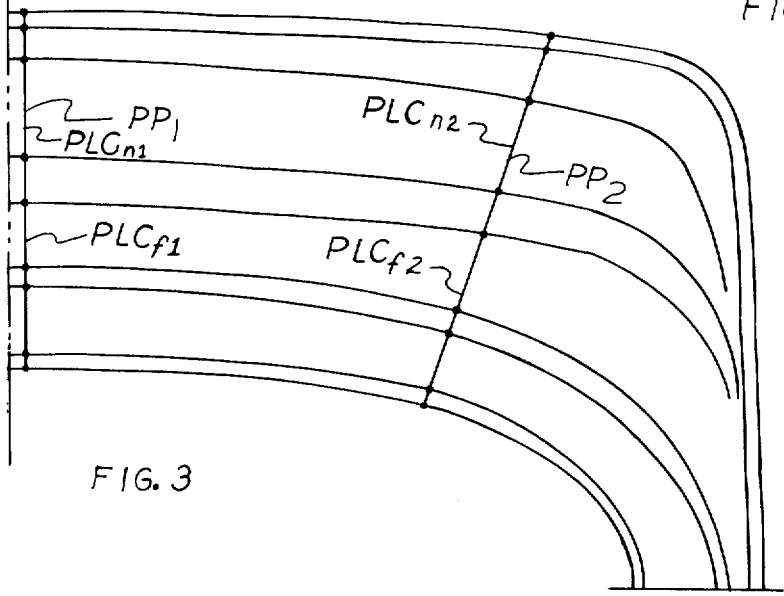
FIG. 3
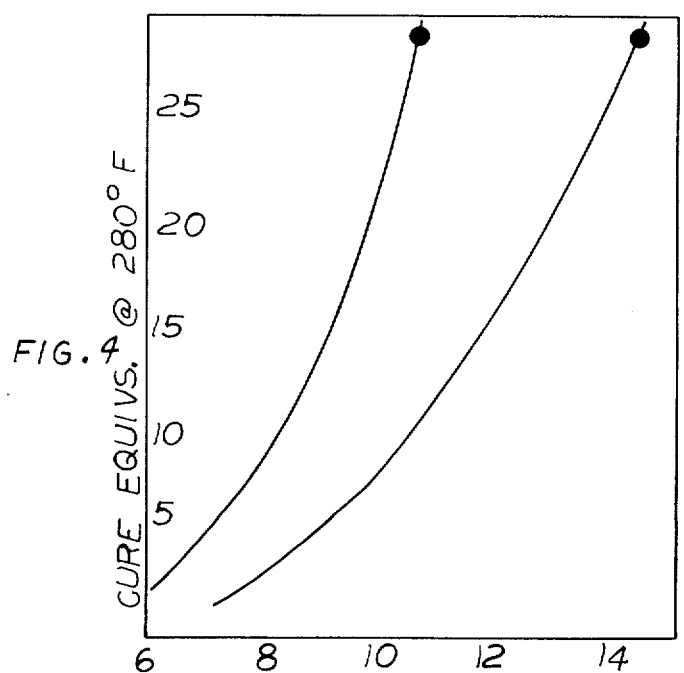
FIG. 4

APPARATUS AND PROCESS FOR VULCANIZING, ADJUSTED FOR VARIABLE LOCATION OF POINT OF LEAST CURE

BACKGROUND OF THE INVENTION

This invention relates generally to the curing of articles by vulcanization. In the following description the terms curing and vulcanizing are used interchangeably and particular reference is made to a vehicle tire cured in a press or mold having an insertable bladder into which high temperature water may be introduced for shaping, curing and molding after which, cold water may be introduced for final curing. In some instances a bladder or other conventional flexible diaphragm means, may be dispensed with. Such operations using a bladder, and sometimes not using any bladder, are conventional and widespread in the tire industry. Most often used are "pot-heaters" or automatic tire shaping and curing presses such as those known by the trademark Bag-O-Matic, manufactured by the McNeil Corp., and those known by the trademark Autoform manufactured by NRM Corp., both of Akron, Ohio, inter alia. These types of automatic presses generally employ separable mold halves with center shaping and curing mechanisms utilizing bladders into which shaping, heating and cooling gases, fluids or other media are introduced for the shaping, molding and curing of tires.

Prior art systems used for controlling the vulcanization of a tire have been classified as operating in either an "elapsed time" mode or in an "elapsed cure equivalents" mode, the latter being far more desirable because the number of cure equivalents required for a cure gives a more accurate determination of the time when the precise optimum cure is effected. A "cure equivalent" is defined as one minute of curing time at a constant reference temperature, usually 280° F.

The calculation of the optimum number of cure equivalents has been made in the prior art based on the Arrhenius equation in which temperatures measured within the tire reflect the effect of thermal diffusion and heat build-up. How this empirical relationship set forth in the equation is used, is taught in U.S. Pat. Nos. 3,819,915; 3,980,743; and 4,022,555 to Thomas W. Smith; and in the application of Diehr and Lutton, Ser. No. 607,463, now U.S. Pat. No. 4,344,142, at 209 USPQ 1 and decided Mar. 1, 1981 by the U.S. Supreme Court, all of which teachings rely on the preselection of a specific fixed point as being the "point of least cure" ("PLC" for brevity), so referred to because it is the critical point at which the desired optimum number of cure equivalents is to be delivered. But such a PLC is by no means fixed.

Obtaining a "perfect" cure may not be critical in some applications but it is especially desirable in aircraft tires, off-the-road (OTR) tires, and even in some relatively very much smaller articles such as V-belts. It is unnecessary to dwell, either on the severe strains to which aircraft tires are routinely subjected, or to the enormous economic losses, both in labor and material, which are incurred when an OTR weighing several thousand pounds is either unacceptably over-cured or under-cured.

The location of the point of least cure (PLC) depends upon (a) the geometry of the tire, (b) the applied boundary temperatures at each surface of the tire being molded, and (c) the thermal diffusion within the tire because of the physical characteristics of the rubber and other components of the tire. Since, even among tires of the same size, there is some variation, it will now be evident that this PLC varies in the same mold, from one tire to the next, the extent of the variation depending upon the variations from one tire to the next, and, particularly if there is any change in the temperature conditions. Since this PLC varies even when all conditions are set at those chosen, it will vary greatly when there is an "upset" in operating conditions. No prior art teaching permits the tracking of this PLC, though with enough actual measurements of temperature at various points within the tire during the curing process, this point is trackable. The self-evident impracticality of doing this is the reason why it is not done.

Stated differently, prior art teachings fix the PLC. It is at this specifically preselected PLC that the necessary determinations are made, irrespective of just how they are made. If the PLC chosen is not the precise PLC for the particular tire being cured, the determinations are nevertheless made at the preselected PLC, which is not the actual PLC, the desired number of cure equivalents are not delivered to the actual PLC, and the resulting time for vulcanizing the tire is not the precise optimum time.

It will be apparent to one skilled in the art that the PLC is calculated, and somehow located in the prior art, because it is critical that no part of the cured tire be under-cured. A relatively substantial degree of over-curing is generally not unacceptable, compared with even a small degree of under-curing. Clearly, if all parts of a tire, whether large or small, were cured for exactly the same number of cure-equivalents, no process requiring calculations would be necessary. It is therefore implicit that, while the PLC is tracked and located in the process of this invention, and while the precise number of cure equivalents desired for the PLC after it is tracked, is an input (as the goal) into the computer, some portions of the tire may be slightly overcured. Such slight overcuring in some portions of a very large tire is inevitable. However, any under-curing which is either demonstrable or unacceptable is avoided.

No prior art reference suggests a process for vulcanizing a tire based upon a determination of optimum time despite varying operating conditions from one tire to another tire of the same geometry and construction, which determination is refined sufficiently to track the PLC as it varies from tire to the next, regardless of what engineering functions are used to make such a determination.

It is well recognized that the art of temperature-sensing permits the physical measurement of temperature at any point upon, or inside, either the article to be vulcanized, or the mold, and such measurements can be, and have been made. It is not so much the measuring of temperature at any location in the system, but the reason for measuring such a temperature at specific points, which reason and specifically chosen points become crucial to the solution of the problem. As is also well recognized, the art is replete with numerous different solutions to the problem, based on as many reasons for expecting that each solution is better than, or more convenient, economical or practical than another.

The choice of temperature sensing locations is determined by the need to obtain measurement of the criteria most likely to provide the parameter desired—namely, the number of cure equivalents at a specified point. The prior art specifies this point, based on fixing its determination from desired operating conditions, and, on the assumption that no upsets due to leakage of hot water, an unexpected change in the temperature conditions in the system, or other upset, will occur. In a tire plant, it is by far better to cure a tire based on a trackable point of least cure.

In the Smith patents referred to hereinabove, a probe is inserted at the point of least cure. In the U.S. Pat. No. 4,022,555, an electrical analogy is used to determine the point of least cure for a mold of particular geometry and specific operating conditions, and it is at the point so determined that the probe is inserted. In the Diehr et al invention, a single constant (x) is used to define the geometry of a mold (which is the negative of the article), which, because it is constant, cannot reflect the effect of changes in boundary conditions. In U.S. Pat. No. 3,649,729 to Davis et al, they teach sensing the temperature of at least two boundary surfaces of a tire, one of which must be inside the tire. Davis, as in other prior art references, must necessarily choose a critical point at which the desired number of cure equivalents is to be delivered. Thereafter, his determinations lack the refinement for thermal diffusion.

Though U.S. Pat. No. 4,044,600 to Claxton et al takes into account thermal diffusion in the tire and simulates actual curing conditions with an analog resistance-capacitance network, he must predetermine the location of the point of least cure. This predetermination provides a reference input. It will be noted that they also teach that measuring the inlet temperature of the hot water to the bladder produces sufficiently accurate monitoring of the internal temperature of the tire, and failed to recognize that it is much more important to measure the temperature of the hot water after it leaves the bladder, as the exit temperature more accurately reflects what happens to the tire while it is being cured. Other references teach monitoring the temperature of the hot water for different purposes, as for example U.S. Pat. No. 2,204,531 to Erbguth who monitored the exit temperature from the bladder to ensure the operator's safety. The press could not be opened if there was a malfunction which might otherwise cause the operator to be burned.

From the profusion of teachings in the art, it will be evident that vulcanization, particularly of pneumatic tires is not easily controlled, because of the complexity of the equipment necessary for imparting the exact desired shape to the tire, and the many variables which have an all-important influence on the time-temperature factors governing the progress and completion of the vulcanization process.

These variables include residual heat from the last previous cure in the external mold, and in the bladder, the ambient air temperature at which green tires to be cured are stored, the cooling effect of the ambient surroundings on the mold and bag, the time the mold remains open before another green tire is placed in it, the time at which heating of the mold is commenced, when heat transfer fluid commences to flow into the bladder (whether before, or simultaneously with, or after placement of a green tire in the mold), and, most of all, the variation, whether programmed or not, of the quantity and temperature level at which heat is supplied to the mold after it is closed.

A change in any one of these variables can influence the progress of the vulcanization reaction in the inside of the tire, or near the outer surface, or both, so that a very complex situation is presented, which has not been easily controlled, and which has resulted in rejection of many unacceptably undercured or overcured tires, or in costly price adjustments because of premature failure or unduly rapid wear.

The best solution of the problem heretofore has been to insert a thermometric probe in the tire and connect it to a computer which opens the mold, for removal of the tire, when the time and temperature of heating in the middle of the thickness of the tire are just sufficient for optimum vulcanization. Even if such a probe does not leave a hole in a portion of the body of the tire, which it generally does, invasive monitoring of temperatures is not desirable. Such probes ar disclosed, for example, in U.S. Pat. Nos. 3,728,721; 3,980,743; and more recently in 4,115,046.

Extending the foregoing teachings of Smith, Diehr et al, Davis and Claxton et al, inter alia, it will be evident that if numerous actual measurements are made continuously within the body of a tire while it is being cured, an excellent profile of the temperatures at each of the points monitored as a function of time, would be generated, and from this information, the PLC could be tracked and located with the aid of an Arrhenius equation using the temperatures monitored. However, to accomplish the same result by sensing only two boundary conditions, regardless of where such boundary conditions are sensed, along with the ambient temperature, and without invading the body of the tire, is quite unexpected and has never been suggested. It is the implementation of the concept of tracking and locating the PLC within the body of a tire, using a microprocessor which has a relatively limited ('small') computational capability to operate a pot heater or curing press, with which this invention is concerned.

SUMMARY OF THE INVENTION

It has been discovered that a tire may be optimally cured in a mold by depending upon tracking the point of least cure ("PLC") for each tire and delivering to the point so tracked, the precise optimum number of cure equivalents without human attention during the process.

It has further been discovered that a trackable point of least cure may be tracked and located for each tire without actually measuring any temperature either on or within the mold, or on or within the body of the tire being molded, and yet provides an accurate time of cure refined for three-dimensional thermal diffusion within the tire.

It is therefore a general object of this invention to provide a process in which the PLC is tracked and located by a simplified mathematical model using equations incorporating constants sensitive to thermal diffusivity and responsive to three-dimensional ("3-D") heat transfer applied at several points along any preselected path within the green tire, and changes in operating boundary temperatures, whichever boundary conditions are desirably used, without making any actual measurement of temperature on or within, either the mold or the tire.

It is a specific object of this invention to provide a process for measuring only the ambient temperature at which tires to be vulcanized are placed in the mold, and then to continually measure two boundary condition temperatures, one derived from the hot water leaving a flexible diaphragm means, if used, which temperature is measured at a point distally located from the bladder and mold, the other derived from measuring the temperature either (i) at the interface of the inner surface of the mold and outer surface of the tire, or (ii) at the surface of the mold, which surface is separated from the outer surface of the tire by the thickness of the mold, or (iii) of the steam outside the mold, the temperature of which steam is measured at a point distally located from the mold surface, the last measurement being preferred since it does not require being physically "tied to" the mold.

It has also been discovered that, by first determining the values of temperatures at a preselected plural number of points in one or more phantom paths across the cross-section of the tire, preferably at its crown, shoulder and/or bead, from finite difference heat transfer equations applied at each of the points in a program for a computer means of relatively unlimited (large) computational capability, solutions of the equations for temperatures at those points are obtained using normal or standard boundary condition inputs as a function of time. The solutions to these equations generate 3-D profiles of temperature, and also of cure equivalents, as a function of time, which are then 'fitted' to a simplified mathematical model of equations capable of solution by a small computer means, by virtue of response factors (M) generated by the large computer means. It is the "fit" and unexpectedly effective utilization of the profiles derived by the small computer means with the profiles derived by the large one, which provides the optimum time of cure, and the assurance that a predetermined number of cure equivalents (cure equivalent goal) are delivered to the PLC which was tracked and located.

It is therefore a specific object of this invention to continuously track and locate the position of the PLC in a tire to be cured, by using a one-dimensional heat transfer equation which includes a response factor (M), to generate a time-temperature profile at several points within the body of the tire, using a small computer means; and, in conjunction therewith, using a large computer means to generate precise 3-D profiles of temperature as a function of time (from which are derived profiles of cure equivalents as a function of time), based on normal or standard operating conditions (deemed most desirable) for the process. These precise 3-D profiles so generated are mimicked by a one-dimensional heat transfer equation by virtue of the M values generated by the large computer means; so that, with these M values in a one-dimensional equation, the curing process is terminated by the small computer means when a predetermined number of cure equivalents ('cure equivalent goal') has been delivered to the PLC which has been tracked and located in the particular tire being cured.

It is yet another specific object of this invention to make it unnecessary to control either the mold (external) temperature whether controlled by steam or any other heating means, or to control the (internal) temperature of superheated water, provided at least one of the boundary temperature conditions is sufficiently high to generate the required cure temperature at the PLC tracked, and this boundary condition is maintained for a long enough time to deliver the desired number of cure equivalents to the PLC.

BRIEF DESCRIPTION OF THE DRAWINGS

The foregoing and other objects and advantages of our invention will appear more fully from the following detailed description, made in conjunction with the accompanying drawings, of preferred embodiments of the invention, wherein like reference characters refer to the same of similar parts throughout the several views:

FIG. 1 is a simplified representation of a 'pot-heater' type of tire vulcanizer;

FIG. 2 is a cross sectional view schematically illustrating one-half of a mold, in an elevational view and about a vertical plane, in which mold a tire to be cured is placed with a bladder inserted therewithin;

FIG. 3 schematically illustrates a cross-sectional profile of a portion of an off-the-road (OTR) tire in which two paths (shown in phantom outline) are selected, each of which paths contain at least three points within the body of the tire, for each of which points a series of finite difference computations are made in the large computer, and thereafter, again for these points, a series of simplified heat transfer equations are applied to generate time-temperature profiles from which the PLC is tracked and located; and, FIG. 4 shows two plots of 'curing time' against 'cure equivalents' delivered to the PLC for two particular OTR tires of identical geometry and construction, one of which was cured during an "upset" of the normal curing cycle (for these tires) to which the other tire was subjected. The plots show the resulting difference in curing time due to the upset. The 'cure equivalents' shown represents the summation of cure equivalent minutes delivered to each tire.

DETAILED DESCRIPTION OF PREFERRED EMBODIMENTS

The invention can be applied to any system for curing or vulcanizing almost any article, but was developed specifically for vulcanizing tires. The invention is especially well adapted for curing an article with an irregular geometry. The invention also conveniently provides the optimum curing conditions for (a) articles with a regular, that is symmetrical, geometry, such as tires, and (b) substantially linearly bounded articles such as V-belts in which it is especially important to obtain a 'perfect' cure, and avoid even slight over-curing such as would be quite acceptable in larger cured articles such as automobile tires.

FIG. 1 illustrates a conventional 'pot-heater' type of vulcanizer, indicated generally by reference numeral 10, in which a stack, indicated generally by reference numeral 20 of one or more split-molds 11, 12, 13 and 14 for tires are placed. The pot-heater includes a large cylindrical pressure vessel 15 having a vertical wall 16 closed at the top with a dome 17 having a butt-plate or back-up plate 19 against which the stack 20 of molds is biased by a hydraulically operated platform 18 on which the stacked molds rest. All these features are conventional in a pot-heater of the type manufactured by United McGill Co. of Columbus, Ohio or Pennsylvania Engineering Corp. of Newcastle, Pa., inter alia, and are well known to those skilled in the art.

Referring now to FIG. 2 there is illustrated one half (about a vertical plane) of the mold 14 in an elevational cross-sectional view, showing a lower mold half 14', shaped to mold one-half of the tread and one side of the tire, and a removably disposed upper mold half 14", which molds the other (upper) half of the tire.

Within each mold is inserted an inflatable bag or bladder 30 which is inserted inside a green tire 40 just before the mold is closed. Superheated water under pressure is circulated through inlet pipes 21, 22, 23 and 24 to each of the molds 11, 12, 13 and 14 respectively, and then into the bladders 30 of each mold. The pressurized bladder compacts the green tire and presses the rubber tread into the recesses of the mold to form the tread pattern. During the curing cycle, heat from the water is transferred to the green tire to be cured. Water temperature is in the range from about 350°–450° F.

Essentially simultaneously with the closing of the pot heater, a control device C1 is actuated and superheated water is supplied to the bladder 30, and at the same time, steam is flowed into the pot heater. The temperature of the steam is typically in the range from about 250° F. to about 350° F., and more preferably in the range from about 265° F. to about 300° F. The steam may be superheated, or saturated steam under pressure, but steam is continuously supplied to the pot heater which is thus pressurized to about the pressure of the steam, until the curing of the tire is deemed complete. Condensate from the pot heater is drained through a drain 25 through a line with a suitable steam trap (not shown).

In accordance with this invention, a first boundary condition is obtained with a remote temperature detector ("RTD") indicated by reference symbol T1 which is mounted in the wall of the pot heater (see FIG. 1) so that it continuously reads the steam temperature which is an input to a computer means (not shown). Alternatively, an RTD indicated by reference symbol T2 may be mounted on the surface of one or both of the mold halves 14' and 14" of one of the molds 14, and the lead from the RTD, whereever it is located, is led through the wall of the pot heater. If an RTD is surface-mounted on a mold, as is T2, it should read only the surface temperature. This requirement is of particular significance if a different type of mold or vulcanizer is used.

As an additional alternative, an RTD indicated generally by reference symbol T3 may be mounted at the interface of the inner surface of the mold and outer surface of the tire.

A second boundary condition is obtained by an RTD indicated by reference symbol T4 placed in each of the outlet pipes 21', 22',23' and 24' of each of the molds 11, 12, 13 and 14 respectively, to measure the temperature of the hot water after it leaves the bladder of each mold. Sensing this second boundary condition in this manner altogether avoids having to make any measurement within the body of the tire inside the molds.

Suppose we are interested in determining the temperature at a point $P_o$ in a block of rubber. The temperature, as a function of time, is dependent upon the thermal diffusivity (alpha) of the rubber and the temperature of the rubber at points $P_1$, $P_2$, $P_3$ ... $P_n$ surrounding $P_o$. Assuming no heat generation within the material, the general heat balance may be expressed as:

$$\frac{\partial^2 t}{\partial x^2} + \frac{\partial^2 t}{\partial y^2} + \frac{\partial^2 t}{\partial z^2} = \frac{1}{\alpha} \frac{\partial t}{\partial \tau} \qquad (1)$$

where
t = temperature and, hereafter, $t_i$ = initial temperature,
$\alpha$ = thermal diffusivity = $k/\rho\, C_p$, wherein
  k = thermal conductivity,
  $\rho$ = density, and,
  $C_p$ = heat capacity,
$\tau$ = time, and
x, y, z are Cartesian coordinates.

A first profile of temperature as a function of time is generated at each point in the chosen path, based on a modification of a program for the finite difference solution of the foregoing equation (1). Details of the program will be found in a report titled "TRUMP: A Computer Program for Transient and Steady State Temperature Distributions in Multidimensional Systems" by Arthur L. Edwards, published as UCRL-14754, Rev. 1, by Lawrence Radiation Laboratory, Univ. of California, Livermore (May 1968), which report is incorporated by reference thereto as if fully set forth herein. The program was also modified to give the point of least cure at any time. This modification was effected with the specific purpose and expectation that time-temperature profiles generated by the modified multidimensional TRUMP program, in which normal boundary conditions are used, could be mimicked with actual time-temperature profiles generated with a one-dimensional heat transfer equation which includes a response factor (M) for each point in the path, adjusted at preselected intervals of time, until the match is made.

It has now been found that after a small increment of time, (from $\tau = 0$ to $\tau = \Delta\tau$), a simplified one dimensional equation, modified to give a three-dimensional (3-D) response, may be written as follows:

$$t_{i,\Delta\tau} - t_{i,0} = \frac{2\alpha\Delta\tau}{(\Delta\sigma)_i^2} [0.5\,(t_{i-1} + t_{i+1}) - t_i] \qquad (2)$$

where $\sigma$ represents the x, y and z coordinates

The foregoing equation (2) may be modified with respect to the numerical value of the multiplicand 0.5, for example, depending upon the precise location of the point to which the equation is being applied, for greater accuracy. When this equation is applied to the same points in the same path chosen, iteratively in three dimensions, it also generates a temperature profile ('second profile') at each point. This second profile is forced to match the first profile by an iterative optimization which provides a series of response factors $M_i$ where:

$$M_i = 2\alpha/(\Delta\sigma)_i^2 \qquad (3)$$

When the first and second profiles are matched, the M values which force this match are used in the small computer with a simplified model of a heat transfer equation of the form:

$$t_{i,\Delta\tau} - t_{i,0} = M_i \Delta\tau [0.5(t_{i-1} + t_{i+1}) - t_i] \qquad (4)$$

Unexpectedly, the M values which force the match are substantially independent of boundary temperatures during the actual curing of the tire, but closely reflect the effect of its geometry, and, the thermal properties of the materials used in its construction. Because of this independence of M values, the correlation between the simplified equation which generates the second profile and the differential equation (1) is excellent. The units of M are inverse time (that is, time$^{-1}$).

In the following description reference is made to an OTR tire in which nine (9) points are taken in a path within the body of the tire. The boundary conditions for these points in this path are a first point $T_4$ (hot water temperature as it leaves the bladder), and an eleventh point $T_1$ (steam temperature in the pot heater).

At time $\tau = 0$, points 2 through 10 are taken as green tire temperature, which is the same as ambient temperature $T_A$ read with an RTD (not shown) and provided as an input to a computer means. The temperatures $T_4$ and $T_1$ are sensed continuously and are provided as inputs every 2.5 min (or any other preselected interval at time) to the computer means. From these inputs the temperatures and number of cure equivalents at each of the points 2 through 10, are computed using the foregoing simplified equation.

The simplified equation states that the change in temperature at a point after a time increment is equal to the difference in temperature between that point and the average of the surrounding points multiplied by the incremental time and a response factor. The response factor depends on the thermal diffusivity characteristics of the material, and the geometry.

It is now evident that a reasonable set of values for M is essential for the correct computation of temperatures across the profile of the tire, and thus for obtaining the correct number of cure equivalents. If the values of M do not permit the computed values at the 9 chosen points to track actual temperature profiles accurately, the number of cure equivalents computed could be incorrect.

Because curing of the tire actually involves three dimensional heat flow, and the materials through which the heat flow occurs are not homogeneous, the values of M should account for these factors. This may be done by iterative computer calculations, adjusting the M values so that each M follows the actual temperature profile in the chosen path in the tire according to a finite difference map through the area of least cure.

Further details of the process

It will now be evident from the foregoing that the large computer means desirably used to solve the modified TRUMP program cannot economically be used to operate a curing process if it has to await analog signals such as would be transmitted from the curing means. Therefore, M values generated in the large computer means are used as inputs to a microprocessor (small computer) which is a digital computer equipped with an analog-to-digital board.

The discovery that time-temperature profiles generated by a simplified equation could be forced to mimic precise temperature profiles generated by a finite-difference modified TRUMP program by generating response factors which fortuitously happen to be essentially independent of actual boundary conditions in the curing process, allows the process to be operated as a two-stage process, and for clarity, it will be so described hereinbelow.

First stage: Generation of M values in the large computer.

The inputs to the modified TRUMP program are on cards which carry all necessary identification of the tire being cured including its geometry and the cure equivalent goal ('CEG') for that tire, for the specific purpose of determining response factors (M values). Cure equivalents are derived from a modified Arrhenius equation of the form $$\ln T = C\left(\frac{1}{t_2} - \frac{1}{t_1}\right)$$

wherein,

T is the ratio of reaction rates at first and second temperatures

C is an activation energy constant determined for the rubber, t is the temperature of the rubber at the time of each calculation, and no constant or functional expression which is a function of the geometry of the tire and mold is either required or necessary.

The CEG is the summation of cure equivalent minutes ('cure equivalents'). The CEG is determined from prior laboratory tests.

The foregoing data will be the same for all tires of the same geometry and having the same materials used in the same type of tire construction. Also included as inputs are the ambient (green tire) temperature; the time increments which are preset; the time '$T_m$' between initial temperature optimizations and printouts, if these are desired; and, the approximate (estimated) time of cure '$T_m$max' for a predetermined number of cure equivalents desired at the PLC. The M values are then calculated by optimization techniques with an iterative process, in any one of several ways which can be worked out with a little trial and error by one skilled in the art.

As a starting point for the iterative process, initial values of M are estimated and used as inputs. Then time-temperature data are input along with the cure equivalent goal at the PLC, from which data are generated by the simplified heat transfer equation (2) solely for the purpose of determining M values. Approximately 20–30 cards are used to define the temperature distribution vs. time, from which is derived 3-D response factors for each of the 9 points in the path chosen.

Second stage: Using the microprocessor to control time of cure.

These M values determined in the first stage are inputs to the microprocessor, again with the CEG, but now there is also included inputs of actual ambient (green tire) temperature, and actual boundary conditions, preferably monitored non-invasively during the cure. The microprocessor applies the M values generated in the large computer to the same simplified heat transfer equation used in the large computer, at each of the 9 points in the path chosen. During the cure, the M values are used in the microprocessor one-dimensionally, but generate a 3-D response from which 3-D profiles of cure equivalents delivered to each of the 9 points as a function of time, are derived. This derivation is made with the same modified Arrhenius equation referred to hereinabove.

The microprocessor applies the M value for each of the 9 points in the chosen path every 2.5 min (say) and derives the number of cure equivalents delivered to each point, using the simplified heat transfer equation (4). The cure equivalents at all the points are scanned every 2.5 min (say) to track and locate the minimum.

If the boundary conditions during the actual cure are precisely the same as the 'normal' boundary conditions used in the large computer to generate the M values, the scanning of the points in the microprocessor shows an identity of temperatures with time in the 1-D and 3-D profiles at each of the 9 points.

When boundary conditions during the actual cure are not precisely the same as the 'normal' conditions used as inputs to the large computer (and they usually are not), then the points scanned by the microprocessor will be different from those obtained with normal boundary conditions. The cure equivalent profiles generated with the actual boundary conditions are scanned every 2.5 min so as locate the minimum number of cure equivalents in each cure equivalent profile. Having located the minimum, the microprocessor matches it with the CEG. When there is a match, the cure is terminated.

General Program Flow:

1. With inputs of normal boundary conditions, the modified TRUMP program is used to generate (i) temperature profiles as function of time, and (ii) cure equivalent profiles as a function of time.
2. Equation (2) is used with initial values for the response factor, and time-temperature profiles are generated along with cure equivalent profiles, using the same normal boundary conditions as in the foregoing step 1.
3. Profiles generated in step 1 are compared with profiles generated in step 2. Based on the differences, adjustments are made to the M values at incremental times.
4. Iteration continues until the profiles generated in step 2 mimic (closely match) those in step 1. At this point, only one adjustment of M values is made per run, at $(T_m\text{max})$.
5. At this point, M values are adjusted such that at the PLC, the value in step 2 is forced to that in step 1, possibly at the expense of a slight error in temperature.
6. A set of M values are obtained which are optimized to match the 3-D heat transfer response of the subject model. This set of M values is substantially independent of actual boundary temperature conditions over a wide range, that is, over about ±200° F. from the normal temperatures.
7. These M values are entered into the microprocessor program for controlling the cure of each tire having the same geometry and thermal characteristics as that for which the M values were obtained. The microprocessor contains a program for the equation (4). With the green tire temperature, and boundary conditions as inputs, the equation is solved and the temperatures at each of the points in the chosen path scanned every 2.5 min to locate the minimum number of cure equivalents. When the minimum matches the CEG, the cure is terminated.

The invention is embodied in the following illustrative examples.

EXAMPLE 1

In a typical example, an off-the-road (OTR) tire having a cross-section of 33.25" and weighing about 3000 lb (pounds), for use on a 35" wheel, is cured in a mold for the OTR tire, in a "pot heater" where several similar molds are stacked and biased against the top ("dome") of the pot heater prior to initiation of the curing process. After the tire is cured it will have a cured gauge (thickness) of 8.8" (inches) across the crown. In this particular embodiment the temperature $T_1$ of steam injected into the pot heater is read by a first remote temperature detector ("RTD") protruding from the inner wall of the pot into the steam heated zone, which RTD reads steam temperature (about 275° F.) continuously. This embodiment is most preferred so as not to be physically attached to the molds with the RTD, as would be the case if the surface of each mold was sensed. Inputs from this first RTD are used in the computer every 2.5 min (minutes).

The ambient temperature $T_A$ (about 80° F., but depending upon the time of the year, may range from about 60° F. to about 95° F.), of the curing room at which tires are stored, is likewise read with a second RTD from which inputs to the computer are made as soon as the cure is initiated.

The precise optimum number of cure equivalents (26.5) sought to be delivered at the PLC is an input to the microprocessor as the CEG.

The pot heater is locked with a bayonet lock which immediately triggers the flow of superheated water into the bladder and initiates measurement of elapsed time. Each outlet pipe from each bladder in each mold has inserted in it additional RTDs from each of which $T_4$ is read continuously, and these readings are inputs to the microprocessor every 2.5 min. The temperature of the water ranges from about 300°–450° F., and more preferably from about 350°–400° F., at a pressure in excess of 200 psig, preferably in the range from about 250–500 psig.

The program in the computer has nine preselected points in each of two paths—one at the crown, and one at the shoulder of the tire. A larger number of points may be selected for greater precision for tracking and locating the PLC. The simplified heat transfer equation (4) is applied at each point using the M value for each point. As mentioned, modifications of the equation in the same form may be used depending upon the location of the point in the path, and the accuracy sought in the computation of temperatures at each of the points.

From the temperatures so determined, cure equivalents are obtained as a function of time. The points are scanned every 2.5 min to locate the minimum. A printout of the values of temperatures as a function of elapsed time (if desired) shows the progress of the cure.

When a summation of cure-equivalent-minutes (the time-temperature history) is made from "zero elapsed time", at each point, scanning the points finds the minimum. The location of this minimum is thus tracked and located during the cure. When this minimum reaches the CEG, the cure is automatically terminated; this occurs after 10 hr. 22 min.

EXAMPLE 2

As an illustration of the shift of the PLC, due to an "upset" in process conditions, two (2) large OTR tires such as described hereinabove, are cured in molds heated externally in the same steam pot used hereinbefore, with a steam temperature of 270° F., but the molds have separate superheated water supply systems. In one mold, superheated water to the bladder remains substantially constant at 365° F. at a water pressure of about 400 psig, the normal operating condition. In the other mold there is an "upset", namely, a failure in the heating system for the superheated water which occurs not long after the cure is initiated, and the temperature of the water drops from 365° F. to 212° F. over a period of 1.5 hr.

Referring to FIG. 3 there is schematically illustrated a profile of a portion of the OTR in which two paths (shown in phantom lines) $PP_1$ and $PP_2$ in the profile are chosen, each having 9 preselected points. The point of least cure ($PLC_{n1}$) for the OTR cured under normal operating conditions is located about 1.5 inches from the surface of the tread. The point of least cure ($PLC_{f1}$) cured under "upset" conditions is near the inner surface of the tire quite close to the bladder. The difference in distance between $PLC_{n1}$ and $PLC_{f1}$ in the cured tire is 3.25 in, and the difference in distance between $PLC_{n2}$ and $PLC_{f2}$ in the cured tire is 3.2 in. in path $PP_2$.

Referring to FIG. 4 there is shown a plot of the number of cure equivalents against elapsed time, showing the normal cure time to be 10 hr., 36 min. while the cure time under upset conditions is 14 hr., 12 min.

A print-out based on the selection of nine points in two separate parts of the tire, one across the profile of the shoulder, and the other across the profile of the center of the tread (or 'crown'), showed that the location of the PLC had shifted about 3.2 inches towards the center in each case. Though, in the case of each path, the shifts (in distance) are substantially equivalent, this was a coincidence. In an analogous procedure, variations in temperature of steam below 270° F. will shift the location of the PLC closer to the tread and away from the center; if the steam temperature should rise about 270° F., then the location of the PLC will again be shifted towards the bladder, assuming in each case that the temperature of the superheated water in the bladder remains essentially constant.

From the foregoing examples it will now be evident that it is not critical which algorithm is used to compute a precise 3-D time-temperature profile, but is critical that a second algorithm containing response factors be found which will allow the simplified 1-D equation embodied in the second algorithm to generate profiles which mimic those obtained with the first 3-D algorithm. Though the finite difference method in a modified TRUMP program has been specifically referred to as the finite algorithm, any other program which iteratively considers a multiplicity of finite zones three-dimensionally, will give satisfactory results. For example, a finite element program referred to as ADINAT, an acronym for "A Finite Element Program for Automatic Dynamic Incremental Nonlinear Analysis of Temperature" written by Klaus-Jurgen Bathe in Report No. 82448-5 and published by the Massachussets Institute of Technology, Cambridge, Mass., may be used to generate the 3-D profiles.

It will also be evident that, whichever 3-D algorithm is used for the first algorithm, some ambient temperature must be chosen, and the same temperature is preferably chosen as the ambient temperature for the 1-D algorithm used as the second algorithm to generate accurate M values. The actual ambient temperature is monitored for the microprocessor while the curing process is effected, is to provide the starting value for temperature. To shorten the length of the curing cycle the green tires are preferably stored at an elevated temperature in the range of from about 100° F. to about 225° F., and most preferably at from about 150° F. to about 200° F.

Further, it will now be apparent that it is unnecessary to control either the mold (external) temperature however the mold may be heated, or to control the (internal) temperature of superheated water, provided either the external temperature or the internal temperature is high enough to generate the required cure temperature at the PLC tracked, and such sufficiently high temperature is maintained for a long enough time to deliver the desired number of cure equivalents to the PLC. However, this does not imply that, despite actual boundary conditions far from the normal conditions used in the first algorithm in the large computer to generate the M values, the tire cured under 'upset' conditions may not be unacceptably overcured, as is one of the tires cured in Example 2 hereinabove. It does confirm that, despite an upset in boundary conditions, the cured tire will not be undercured.

However, it will be equally apparent that in actual operation, both the temperature external to the tire (usually set by the temperature of the steam in the pot heater) and the temperature internal to the tire (usually set by the the temperature of the superheated water in the bladder) will be controlled within relatively narrow limits.

It will still further be evident that the boundary conditions will preferably be monitored non-invasively, most preferably without making any actual measurement within the mold, or even being tied to the surface of it. However, where molds are available which are provided with probes to monitor the boundary conditions within the body of the tire, or the mold, or at the interface of the tire and mold, the solutions to the equations in the microprocessor would still be effected in a manner analogous to that described hereinabove.

The terms 'externally' and 'internally' have been used herein with reference to the manner of heating a split-mold and of curing a green tire because the tire is of a generally hollow toroidal shape, and this invention is particularly directed to the mold-vulcanization of tires in conventional curing means. However, this invention may also be of value in the heating and curing of solid bodies of arbitrary shape, or geometrically well-defined shapes such as V-belts, and substantially rectangularly shaped bodies which may be regarded either two-dimensionally or even one-dimensionally, if heat is transferred along substantially only one direction. If regarded one-dimensionally, $\sigma$ in the response factor will be applied along a single Cartesian coordinate; if regarded two-dimensionally, then $\sigma$ will be applied in two directions, and, in the general case, and particularly with respect to the vulcanization of tires, $\sigma$ will be applied in three directions.

I claim:

1. A method for curing an article from a curable synthetic resinous material in a reusable mold defining a split mold cavity in which a green article of said curable material is to be contacted internally with a heat transfer fluid, and externally by said split mold which is included in a curing means, comprising:

(a) sensing the ambient temperature at which said green article is placed in said mold, (b) closing said mold, and heating said green article sufficiently to maintain said article at a temperature within a predetermined range of curing temperature until the desired cure of said material is effected, (c) sensing at least two boundary temperature conditions while said material is being cured, a first of said conditions being determined by temperature external to the body of said article, and a second of said conditions being determined by temperature internal to said body, (d) continually sensing said first and second boundary conditions during the time period between closure of said curing means and termination of cure, (e) selecting at least three points along a path within the body of said article, to determine the point of least cure within said article, (f) repetitively calculating at frequent periodic intervals after closure of said curing means, temperatures along said path at each one of said three points as a function of time, thermal diffusivity of said material, and the mass and geometry of said tire, so as to track and locate said point of least cure, (g) computing the number of cure equivalents actually delivered to the point of least cure, (h) matching the number of cure equivalents computed as having been actually delivered at said point of least cure with a predetermined cure equivalent goal at said point of least cure, (i) terminating curing of said article when the number of cure equivalents actually delivered at the point of least cure so tracked and located matches the cure equivalent goal, and, (j) opening said curing means to remove the cured article.

2. The method of claim 1 wherein said article is a tire, said curable material is vulcanizable rubber, said boundary conditions are sensed noninvasively, and said path is a phantom path.

3. The method of claim 2 wherein step (f) includes calculating said temperatures along said phantom path at successive sufficiently small increments of time to give a stable determination, by applying the following one-dimensional equation at each of said points in said path of the form:

$$t_{i,\Delta\tau} - t_{i,0} = \frac{2\alpha\Delta\tau}{(\Delta\sigma)_i^2} [0.5 (t_{i-1} + t_{i+1}) - t_i]$$

wherein, t = temperature, the subscripts referring to points, time, etc.

$\alpha$ = a thermal diffusivity = $k/\rho C_p$, wherein k = thermal conductivity, $\rho$ = density of material, $C_p$ = heat capacity, $\tau$ = time, $\sigma$ = a geometric parameter which is a combination of values in at least one Cartesian direction, and, i identifies a point in said path.

4. The process of claim 3 wherein, $$2\alpha/(\Delta\sigma)_i^2 = M$$

is a response factor responsive to an algorithm in which temperatures are computed responsive to heat flow in three dimensions through a multiplicity of finite zones in at least one path across a profile within said body.

5. The method of claim 4 wherein said first boundary condition is sensed at the interface of the inner surface of said mold and outer surface of said tire.

6. The method of claim 4 wherein said first boundary condition is sensed at the surface of said mold, which surface is separated from the outer surface of said tire by the thickness of said mold.

7. The method of claim 4 wherein said first boundary condition is sensed as temperature of steam outside said mold, at a point distally located from said mold's surface.

8. The method of claim 4 wherein said heat transfer fluid is circulated through a bladder means in contact with said tire.

9. The method of claim 8 wherein said heat transfer fluid is superheated water at a temperature in the range from about 300° F. to about 450° F.

10. The method of claim 7 wherein said steam is at a temperature in the range from about 250° F. to about 350° F.

11. A method of curing an article of a curable rubbery material with the aid of a digital computer, by delivering a preselected number of cure equivalents at the point of least cure irrespective of variation in location thereof within said article due to changes in actual operating temperatures, specified as first and second digital boundary conditions, during operation of a curing means in which said article is to be cured, comprising:

(a) providing said computer with a data base including physical properties of said material, the geometry of said article to be cured, preselected normal operating temperatures specified as first and second normal boundary conditions for operating said curing means, and a preselected ambient temperature;

(b) preselecting a multiplicity of finite zones in at least one path across a profile within the body of said article, and repetitively solving iteratively, a first algorithm in which temperatures are computed responsive to heat flow in three dimensions through said article as a function of time;

(c) generating a three-dimensional first time-temperature profile through said zones in said path;

(d) providing a one-dimensional second algorithm in which temperature is a function of time, and, which includes a response factor (M);

(e) obtaining values for said response factor (M) at each point in said three-dimensional profile;

(f) generating a second time-temperature profile at said points in said path with said second algorithm and said response factor values obtained in step (e);

(g) comparing by iterative solutions of steps (e) and (f), at predetermined intervals of time, said second profile with said first profile until said first and second profiles are matched;

(h) providing values of said response factor (M) to match the profiles, along with (1) a cure equivalent goal, (2) the ambient temperature, and (3) actual boundary temperature conditions during cure, as inputs into said one-dimensional algorithm at each point in said path;

(i) repetitively computing the temperatures at each point and summing cure equivalents derived therefrom at each point at predetermined intervals of time;

(j) scanning all the points in said path to track and locate the point of least cure;

(k) matching the cure equivalents at the point of least cure with the cure equivalent goal; and, (l) terminating the cure when the number of cure equivalents at the point of least cure so tracked and located is matched with the cure equivalent goal.

12. The method of claim 11 wherein said digital computer includes a first relatively large computer and a second relatively small computer or microprocessor, and said M values are generated in said large computer; and, said one dimensional algorithm includes M values generated in said large computer is used in said microprocessor to track and locate the point of least cure during curing of said rubbery material.

13. The method of claim 12 wherein said first algorithm is a finite difference modified TRUMP program, and said second algorithm is of the form:

$$t_{i,\Delta\tau} - t_{i,0} = \frac{2\alpha\Delta\tau}{(\Delta\sigma)_i^2} [0.5 (t_{i-1} + t_{i+1}) - t_i]$$

wherein, t = temperature, $\alpha$ = thermal diffusivity = $k/\rho C_p$, wherein k = thermal conductivity, $\rho$ = density of material, $C_p$ = heat capacity,
$\tau$ = time,
$\sigma$ = a geometric parameter which is a combination of values in at least one Cartesian direction, and,
i identifies a point in said path.

14. The method of claim 13 wherein, $$2\alpha/(\Delta\sigma)_i^2 = M$$

is said response factor responsive to said second algorithm in which temperatures are computed responsive to heat flow in three dimensions through a multiplicity of finite zones in at least one path across a profile within said body.

15. The process of claim 14 wherein $\sigma$ is applied along two Cartesian coordinates.

16. The process of claim 14 wherein $\sigma$ is applied along three Cartesian coordinates.

17. Apparatus for curing a green article of curable synthetic resinous material in a split-mold which is heated internally and externally in a curing means, comprising,
    (a) timing means for measuring time upon closure of said curing means,
    (b) first temperature sensing means to continually sense a first boundary condition determined by temperature external to said article during the time period between closure of said curing means and termination of cure,
    (c) second temperature sensing means to continually sense a second boundary condition determined by temperature internal to said article during the time period between closure of said curing means and termination of cure,
    (d) third temperature sensing means to transmit the temperature at which said green article is placed in said mold, and,
    (e) computer means comprising
        (i) means to repetitively calculate at frequent periodic intervals after closure of said curing means, temperatures along a path at each one of at least three preselected points as a function of time, thermal diffusivity of said material, and the mass and geometry of said tire, so as to track and locate the point of least cure,
        (ii) means to compute the number of cure equivalents actually delivered to the point of least cure, and,
        (iii) means to match the number of cure equivalents computed as having been actually delivered at said point of least cure with a predetermined cure equivalent goal at said point of least cure.

18. The apparatus of claim 17 wherein said first boundary condition and said second boundary condition are each sensed at points distally located from said mold.

19. The apparatus of claim 17 wherein said first boundary condition is sensed at the surface of said mold.

20. The apparatus of claim 18 wherein said first boundary condition is sensed in a steam-heated zone surrounding said mold.

21. The apparatus of claim 18 wherein said second boundary condition is sensed as the temperature of heat transfer fluid circulated within a bladder means within said article, at the outlet of a conduit for said fluid from said bladder means.

* * * * *